(12) United States Patent
Jaeger et al.

(10) Patent No.: US 8,186,773 B2
(45) Date of Patent: May 29, 2012

(54) METHOD FOR CONTROLLING A BRAKING SYSTEM OF A MOTOR VEHICLE

(75) Inventors: Markus Jaeger, Eschborn (DE); Gregor Schmitt, Frankfurt (DE)

(73) Assignee: Continental Teves AG & Co., OHG, Frankfurt (DE)

( * ) Notice: Subject to any disclaimer, the term of this patent is extended or adjusted under 35 U.S.C. 154(b) by 898 days.

(21) Appl. No.: 11/792,808

(22) PCT Filed: Dec. 9, 2005

(86) PCT No.: PCT/EP2005/056648
§ 371 (c)(1),
(2), (4) Date: Jun. 11, 2007

(87) PCT Pub. No.: WO2006/061433
PCT Pub. Date: Jun. 15, 2006

(65) Prior Publication Data
US 2008/0093179 A1    Apr. 24, 2008

(30) Foreign Application Priority Data

Dec. 9, 2004  (DE) .................. 10 2004 059 585
Dec. 9, 2005  (DE) .................. 10 2005 059 373

(51) Int. Cl.
*B60T 8/64* (2006.01)
(52) U.S. Cl. .............. 303/152; 303/11; 303/3; 188/156; 180/65.1
(58) Field of Classification Search ............... 303/3, 11, 303/152; 188/72.2, 156; 701/22; 180/65.1
See application file for complete search history.

(56) References Cited

U.S. PATENT DOCUMENTS

| 4,671,577 | A  | * | 6/1987 | Woods ........................... 303/3 |
| 4,962,969 | A  | * | 10/1990 | Davis ........................... 303/3 |
| 5,378,053 | A  |   | 1/1995 | Patient et al. |
| 5,433,512 | A  |   | 7/1995 | Aoki et al. |
| 5,511,859 | A  |   | 4/1996 | Kade et al. |
| 5,839,800 | A  | * | 11/1998 | Koga et al. ................... 303/152 |
| 6,116,363 | A  |   | 9/2000 | Frank |
| 6,454,364 | B1 | * | 9/2002 | Niwa et al. ................... 303/152 |
| 6,508,523 | B2 | * | 1/2003 | Yoshino ....................... 303/152 |
| 6,655,754 | B2 | * | 12/2003 | Crombez et al. ............. 303/152 |
| 6,687,593 | B1 | * | 2/2004 | Crombez et al. ............. 701/71 |
| 6,709,075 | B1 | * | 3/2004 | Crombez et al. ............. 303/152 |
| 7,093,912 | B2 | * | 8/2006 | Brown et al. ................. 303/146 |
| 7,441,845 | B2 | * | 10/2008 | Crombez et al. ............. 303/152 |
| 2003/0230933 | A1 |   | 12/2003 | Schneider et al. |

FOREIGN PATENT DOCUMENTS

| DE | 4435953 | 5/1995 |
| DE | 4446219 | 6/1996 |
| DE | 19532163 | 3/1997 |
| DE | 19604134 | 8/1997 |
| DE | 10101830 | 7/2002 |
| WO | 2004080774 | 9/2004 |

* cited by examiner

*Primary Examiner* — Robert A Siconolfi
*Assistant Examiner* — Mariano Sy

(57) ABSTRACT

Disclosed is a method for controlling a brake system (1) of a motor vehicle, which includes an electric generator (4) and a number of hydraulic, electronically controllable friction brakes (2) being allocated to axles of the motor vehicle, and the brake torque of which is composed of the brake torque of the generator (4) and the brake torque of the friction brakes (2), is intended to safeguard great brake comfort of the brake system (1). To this end, a number of friction brakes (2) are connected only when the total nominal brake torque exceeds the total actual brake torque by a selected maximum brake torque difference.

10 Claims, 1 Drawing Sheet

METHOD FOR CONTROLLING A BRAKING SYSTEM OF A MOTOR VEHICLE

This application is the U.S. national phase of international application PCT/EP05/56648 filed Jan. 9, 2005, which designated the U.S. and which claims the benefit of priority of German Patent Application Number 10 2005 059 373.9 filed Jan. 9, 2005 and German Patent Application Number 10 2004 059 585.2 filed Jan. 9, 2004. The contents of each of the aforementioned documents are incorporated herein in their entirety.

BACKGROUND OF THE INVENTION

The present invention relates to a method for controlling a brake system of a motor vehicle, in particular for controlling a regenerative brake system, with a number of friction brakes and an electric generator for a motor vehicle. It further relates to a regenerative brake system for a motor vehicle.

So-called regenerative brake systems can be employed in motor vehicles, wherein at least part of the energy produced during braking in the vehicle can be stored and re-used later on for the drive of the vehicle. This allows reducing the energy consumption of the vehicle in total, increasing the efficiency, and thus rendering its operation more economical. To comply with varying system requirements, motor vehicles with a regenerative brake system generally include different types of brakes, which are also called brake actuators, i.e. typically hydraulically actuated friction brakes, on the one hand, and an electro-regenerative brake, on the other hand.

Like in conventional friction brakes, the brake pressure for the friction brakes in systems of this type is generated at least partly by means of a brake pressure generating means or by way of the brake pedal movement, respectively. The electro-regenerative brake is generally configured as an electric generator, through which at least part of the total brake capacity is generated. The produced electric energy is fed into a storage medium such as an on-board battery, or fed back, respectively, and is reused for the drive of the motor vehicle by way of an appropriate drive.

Regenerative brake systems can be designed as so-called serial regenerative concepts, where the component of the brake torque that is produced by the generator is as high as possible. In contrast thereto, parallel or so-called residual-moment-based regenerative concepts are known, where the brake torque is distributed in predefined ratios to the brake actuators. Mixed concepts of these two brake concepts are also known in the art. It is common to all systems that several brake actuators are used for simultaneous braking at least in some ranges of the brake torque to be generated so that the total deceleration is composed of the deceleration components of the brake actuators.

In this arrangement, the braking energy is generally split up into components of the friction brakes and into components of the electric generator, said split-up being dependent on the nominal brake torque, the charging condition of the battery, and especially the field of operation and other special properties of the generator. Due to the split-up of braking energy, the brake pressure is therefore built up at least partly independently of the hydraulic influence of the brake pedal in regenerative brake systems.

In conventional brake systems, however, which have only one friction brake, the brake pressure is built up depending on the position of the brake pedal. In this arrangement, the pressure of a braking medium is built up by way of the position of the brake pedal with or without auxiliary energy, the braking medium being received in the friction brake. Thus, the pedal position corresponds to the brake performance of the motor vehicle. Exceptions can be the use of electronic safety systems such as an electric stability program (ESP), which can comprise devices for the independent brake pressure development irrespective of the brake pedal position.

Compared to this conventional brake performance, it is disadvantageous in the brake performance of a regenerative brake system, composed of the combination of an electro-regenerative brake and a conventional, hydraulically operated friction brake that the position of the brake pedal does not necessarily correspond to the brake performance of the motor vehicle. Hence, the position of the brake pedal can remain constant e.g. during increase of the brake deceleration, what is a very unusual brake feeling for the driver, with the result that only insufficient brake comfort develops.

So-called 'brake-by-wire' systems can be employed to solve this problem. Electronic sensors are used in these brake systems to sense the braking request of the driver at the brake pedal. As this occurs, brake fluid is conducted from a high-pressure accumulator to the friction brakes e.g. by way of electronically actuated valves. The high-pressure accumulator is filled with brake fluid by a motor-and-pump assembly and is acted upon by the corresponding pressure. In 'brake-by-wire' systems of this type, exclusively the high-pressure accumulator generally produces the required brake pressure at the friction brakes, with the exception of failure of system components, so that the brake pedal is principally uncoupled from the friction brakes because the control or the supply of brake fluid to the friction brakes is electronically controlled. Uncoupling the brake pedal from the friction brakes allows integrating a pedal control, which is appropriate for a regenerative brake system, into the brake system so that an acceptable brake pedal feeling is achieved.

When a regenerative 'brake-by-wire' system is designed as a serial brake system, the aim is to achieve a maximum great brake torque component by the electro-regenerative brake. To this end, braking is initially performed using the electric generator exclusively. The friction brakes are connected electronically only when the total nominal brake torque exceeds the brake torque, which can maximally be generated by the generator, as has been described in the above. The brake torque, which can be produced maximally by the generator, depends both on the charging condition of the on-board battery and on the operating range and efficiency of the generator, varying depending on the speed of the motor vehicle.

When connecting the friction brakes in a 'brake-by-wire' system of this type, it is disadvantageous that the friction brakes are activated and deactivated repeatedly due to variations of the maximum generator brake torque in the course of speed, or due to variations in the braking request, what causes an increased wear of the friction brakes. Due to the increased stress caused by noise in repeating connecting and disconnecting actions of friction brakes, this brake performance also causes an unpleasant braking and driving comfort for the driver. A similar problem can occur when the friction brakes are actuated separately at different axles of the motor vehicle and, due to an optimal brake force distribution and the generator brake torque, which usually acts on only one axle of the motor vehicle, the friction brakes at the other axle are activated, however, they are not activated on the generator axle. Likewise in this event, insignificant variations of the braking request or the available generator braking power render the friction brakes at the generator axle repeatedly active and passive. In this case, too, repeated connection and disconnection of the friction brakes causes a negative brake feeling for the driver.

In view of the above, an object of the invention is to disclose a method for controlling a brake system as described above, which allows achieving great braking comfort with the brake system, yet entails little effort. Another objective relates to a brake system for implementing the method.

SUMMARY OF THE INVENTION

With respect to the method, this object is achieved by the invention because, initially, only the generator is activated according to the specification of a situation-responsively determined total nominal brake torque, and the friction brakes are connected only when the total nominal brake torque exceeds the maximum available brake torque of the generator by a predetermined first maximum brake torque difference.

The invention is based on the reflection that great brake comfort can be achieved in particular by consequently avoiding frequent connection and disconnection of the friction brakes along with the accompanying loss in comfort. It can be taken into consideration that the specification of an approach of the total actual brake torque to the total nominal brake torque in realized brake systems in most cases cannot be satisfied exactly anyway, what is due to deviation and change of defined parameters, as they occur e.g. due to wear of the friction brakes. While deliberately tolerating a certain difference between the total nominal brake torque and the total actual brake torque, which cannot be avoided anyway in most cases, the amount of the difference between the total nominal brake torque and the total actual brake torque in the critical ranges, in which a repeated connection and disconnection of friction brakes can occur, should be maintained on such a high level in terms of control technique that early connection or disconnection of friction brakes can be prevented. When the maximum generator brake torque is exceeded, friction brakes are therefore connected in the way of a deliberately delayed activation only when the total nominal brake torque exceeds the total actual brake torque by a selected maximum brake torque difference.

In this case, the tolerance with regard to the total nominal brake torque or the maximum brake torque difference should be rated in such a way that a premature connection of the friction brakes is prevented, and simultaneously the difference from the total nominal brake torque does not become excessive. The maximum brake torque difference advantageously ranges between zero Nm and roughly 300 Nm.

With friction brakes of different axles of the motor vehicle that can be actuated separately, expediently, only those friction brakes of the brake system are initially connected, which are not allocated to an axle of the motor vehicle that is connected to a generator. In a motor vehicle with two axles, an acceptable brake force distribution is ensured this way, because friction brakes on the axle that is not connected to the generator are used to brake in addition to the brake torque generated by the generator. In another favorable embodiment, a nominal brake torque is determined in a like system, based on the total nominal brake torque and the maximum available brake torque of the generator, for those friction brakes that are allocated to an axle connected to the generator, and these friction brakes are connected only when the total brake torque exceeds the determined nominal brake torque by a predefined second maximum brake torque difference.

To prevent the connected friction brakes, which are arranged on the axle connected to the generator and/or on the axle that is not connected to the generator, from being deactivated prematurely, or in order that they reconnect already after a short deactivation phase, preferably, an allocated minimum brake torque is predetermined as a nominal brake torque to these friction brakes after the connection, until the theoretical nominal brake torque determined for the respective axle has dropped to a predetermined limit value. Thus, a delayed disconnection of the friction brakes is predetermined in addition to the delayed connection thereof. Hence, the brake torque variation of the connected friction brakes is designed like a hysteresis curve, and an application with a comparatively too low nominal brake torque occurs when the friction brakes are connected, while an application with a comparatively too high nominal brake torque occurs when the friction brakes are disconnected.

Preferably, the delayed connection and disconnection of the friction brakes can be carried out in two steps. In a first step, those friction brakes are connected or disconnected, which are allocated to a vehicle axle that is not connected to the generator, while in a second step those friction brakes are connected or disconnected, which are allocated to a vehicle axle connected to the generator.

Advantageously, especially the brake torque difference of the deactivated friction brakes, which are allocated to an axle connected to the generator, is compensated by an appropriate additional application of the respectively other friction brakes. Suitably, a theoretical nominal brake torque is determined for each friction brake by way of the total nominal brake torque and the maximum available brake torque of the generator. The difference between the nominal brake torque that is actually output to the respective friction brake and the theoretical nominal brake torque being determined for it, which difference occurs on those friction brakes being allocated to an axle of the motor vehicle connected to the generator, is output in a predetermined share as an additional nominal brake torque to those friction brakes, which are not allocated to the axle of the motor vehicle connected to the generator.

In order to avoid an excessive brake force shift when those friction brakes are connected, which are compensated by an application of the nominal brake torque of other friction brakes before the time of connection or the maximum brake torque difference are reached, the share of the brake torque difference for the application is selected correspondingly. Suitably, 25% approximately are chosen for the share of the brake torque difference.

Preferably, a control unit of the brake system is used to implement the method described.

The advantages achieved by means of the invention especially imply the possibility of safeguarding an acceptable brake performance in a 'brake-by-wire system' by suppressing a repeated connection and disconnection of friction brakes. This avoids the stress caused by noise, which would develop during repeated connection and disconnection, with the result of brake and driving comfort improving. The superposition of appropriate hysteresis curves on the previously critical change-over thresholds of the friction brakes reduces the number of connecting and disconnecting processes of friction brakes. Thus, brake operations are rendered more pleasant for the driver as regards the braking and driving feel, and friction brakes are only connected or disconnected when the requested brake torque moves away from the switching thresholds of the hysteresis curves or moves into them. As this occurs, the generator of the brake system can be operated without control, so that the available maximum generator brake torque can be exploited and it is thus possible to recuperate a great energy component when braking. The result is high efficiency of the motor vehicle.

An embodiment is explained in detail by way of FIGS. 1 and 2.

DETAILED DESCRIPTION OF THE DRAWINGS

Figure 1:
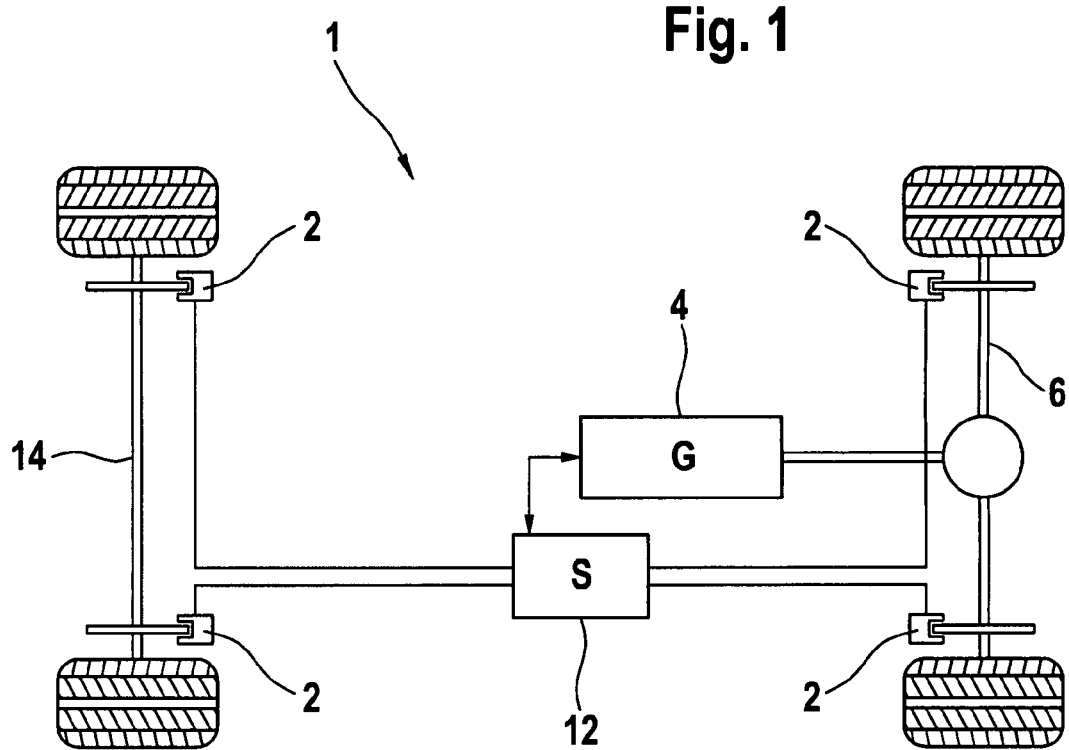
FIG. 1 shows a basic circuit diagram of a brake system 1.

FIG. 1 illustrates a basic circuit diagram of a brake system 1 for a motor vehicle with two axles. Brake system 1 is a regenerative brake system 1 which, apart from four friction brakes 2, also includes an electric generator 4 for producing electric energy. To this end, the electric generator 4 is connected to the front axle 6 of the motor vehicle. The brake system 1 is designed as a serial system, where a maximum great component of the total brake torque shall be generated using the generator 4 in order to achieve high efficiency of the brake system 1 and, thus, of the motor vehicle. Generator 4 is basically operated without control, so that it is operated with its respectively maximally available brake torque depending on the speed of the motor vehicle and the charging condition of an on-board battery (not shown) into which the acquired electric energy for driving the motor vehicle is introduced by a drive (that is not shown either).

The brake system 1 is designed as a so-called 'brake-by-wire' system in order to be able to control the brake system 1 in view of the generator brake torque that varies in its magnitude in response to the speed of the motor vehicle and the charging condition of the on-board battery, or to supplement the respectively corresponding brake torque, which cannot be generated using generator 4, by way of connecting the friction brakes 2. In this case, the braking request of the driver is sensed by means of a redundantly designed electronic travel generator at the brake pedal, and the overall brake system 1, such as the friction brakes 2 in particular, are controlled by way of an electronic control unit 12.

The brake pedal travel or the position of the brake pedal in addition to the pressure of the brake fluid in the hydraulic lines is used as input quantities for the control unit 12.

Control unit 12 uses an appropriate method to control the brake system 1 for the purpose of especially great braking comfort. In particular, the method aims at avoiding a repeated connection and disconnection of friction brakes 2 due to a varying total nominal brake torque or varying generator capacity, what would have negative effects on the braking comfort. This is achieved in that the control unit 12 drives the friction brakes 2 based on a hysteresis curve.

Figure 2:
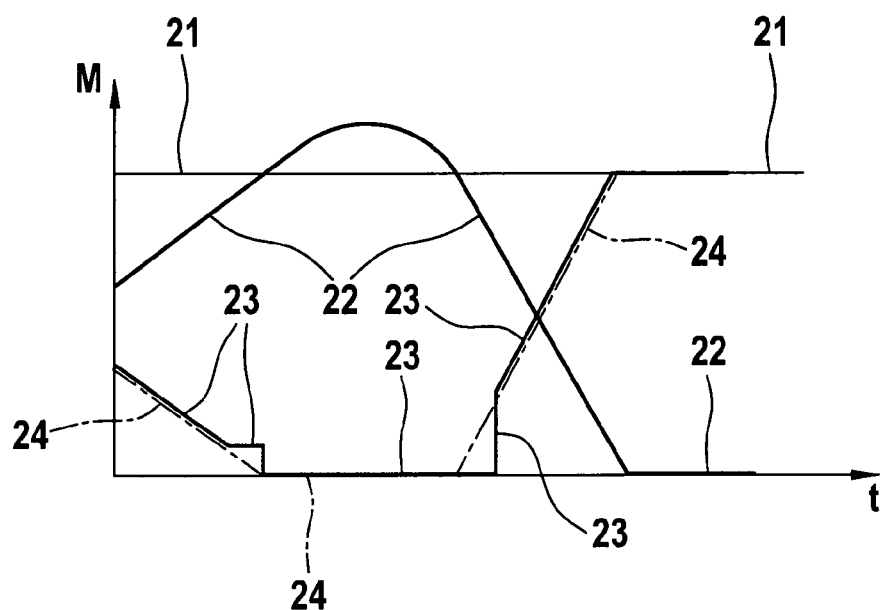
FIG. 2 shows the brake force distribution of the brake system 1 during a brake operation.

A brake operation of the brake system 1 is shown in FIG. 2 in order to explain the method. During the brake operation, a constant total nominal brake torque is assumed, which the driver requests through brake pedal 6. This total nominal brake torque is illustrated in line 21 and is constant in terms of time. The maximum available brake torque of the generator 4 is plotted in line 22 in the course of time. The maximum generator brake torque exceeds the total nominal brake torque in a time range that can be seen in FIG. 2, so that only in this range the maximum available brake torque of the generator 4 is not requested, but only the brake torque, which corresponds to the total nominal brake torque.

In the other phases of the brake operation, friction brakes 2 generate the brake torque difference, which is necessary to achieve the total nominal brake torque on account of the limited maximum generator brake torque, and only the friction brakes 2 of the rear axle 14 of the motor vehicle are initially connected in the embodiment, the brake torque variation whereof becomes apparent from line 23. Line 24 shows the brake torque difference that is necessary theoretically, due to the limited maximum generator brake torque, to achieve the total nominal brake torque in the course of time. As can be taken from FIG. 2, the brake torque of the rear friction brakes 2 decreases from the start of the brake operation initially with rising generator capacity continuously along with the brake torque difference to add to the generator brake torque, and the total actual brake torque initially corresponds to the total nominal brake torque. The control unit 12 predefines a minimum brake torque, which amounts to 25 Nm in the embodiment, for the rear friction brakes 2 before a minimum brake torque difference is reached, which amounts to zero Nm in the embodiment. As a result, the brake torque of the rear friction brakes 2 is maintained constant at 25 Nm when the brake torque difference falls under 25 Nm. The rear friction brakes 2 are deactivated only when the brake torque difference has dropped to zero Nm. Thus, the total actual brake torque exceeds the total nominal brake torque in the range of a brake torque difference declining from 25 Nm to zero Nm. With a declining generator capacity and a rising brake torque difference, the rear friction brakes 2 are reactivated only when the brake torque difference exceeds a predetermined maximum brake torque difference of 50 Nm, as can be seen in the Figure. Thereafter, the brake torque of the front friction brakes 2 rises along the rising brake torque difference.

When a maximum and minimum threshold, similar to a hysteresis curve, is superposed on the connection and disconnection point of the friction brakes 2, this reduces a frequent connection and disconnection of the friction brake, which would appear with insignificant variations of the brake torque request or varying generator capacity.

In case the brake torque is exceeded, which is to be generated maximally by means of the generator 4 and the rear friction brakes 2, the front friction brakes 2 are likewise activated by means of the control unit 1, what is not shown in the illustrated brake operation in FIG. 2. Similar to the rear axle, the control unit 12 connects and disconnects likewise the friction brakes 2 of the front axle in such a fashion that repeated connection and disconnection of the front friction brakes is prevented. On the contrary, the front friction brakes are only connected when the brake torque difference exceeds a maximum brake torque difference of 75 Nm. After the activation, the friction brakes are only deactivated when the brake torque difference has dropped to a minimum brake torque difference of zero Nm. Beforehand, a minimum brake torque of 50 Nm is predefined for the front friction brakes 2.

In order to compensate part of the brake torque that is not generated by the front friction brakes because they are deactivated, in the event of a brake torque difference of lower than 75 Nm, a component of the brake torque difference is applied to the nominal brake torque of the rear friction brakes 2. The component of the brake torque difference for the application of the rear axle amounts to 25% approximately in order to prevent excessive pitching of the motor vehicle that is due to a connection of the front friction brakes 2, which is caused by previous excessive brake torque compensation at the rear axle, when the brake torque difference of 75 Nm is reached.

LIST OF REFERENCE NUMERALS 1 brake system
2 friction brake
4 generator 6 front axle
12 control unit
14 rear axle
21, 22
23, 24 line

The invention claimed is:

1. A method for controlling a brake system (1) of a motor vehicle, which includes an electric generator (4) and a number of hydraulic, electronically controllable friction brakes (2) allocated respectively to one axle of the motor vehicle, and the brake torque is composed of a brake torque of the generator (4) and a brake torque of the friction brakes (2), the method comprising:
   initially, activating only the generator (4) according to specification of a situation responsively determined total nominal brake torque;
   connecting the friction brakes (2) in a delayed manner only when the total nominal brake torque exceeds a maximum available brake torque of the generator (4) by a predetermined first maximum brake torque difference; and
   maintaining the friction brakes at a constant brake torque before a minimum brake torque difference is attained between the total nominal brake torque and the maximum available brake torque of the generator.

2. A method for controlling a brake system (1) of a motor vehicle, which includes an electric generator (4) and a number of hydraulic, electronically controllable friction brakes (2) allocated respectively to one axle of the motor vehicle, and the brake torque is composed of a brake torque of the generator (4) and a brake torque of the friction brakes (2), the method comprising:
   initially, activating only the generator (4) according to specification of a situation responsively determined total nominal brake torque;
   connecting the friction brakes (2) in a delayed manner only when the total nominal brake torque exceeds a maximum available brake torque of the generator (4) by a predetermined first maximum brake torque difference, wherein
   only friction brakes (2), of the brake system (1) are initially connected, that are not allocated to an axle of the motor vehicle that is connected to the generator (4); and
   maintaining the friction brakes at a constant brake torque before a minimum brake torque difference is attained between the total nominal brake torque and the maximum available brake torque of the generator.

3. A method according to claim 2, wherein based on the total nominal brake torque and the maximum available brake torque of the generator (4), a nominal brake torque is determined for friction brakes (2) that are allocated to an axle connected to the generator (4), and these friction brakes (2) are connected in a delayed manner only when the total nominal brake torque exceeds the nominal brake torque determined for the friction brakes (2) that are allocated to an axle connected to the generator by a predetermined second maximum brake torque difference.

4. A method according to claim 3, wherein a maximum brake torque difference ranging between zero Nm and approximately 300 Nm is predetermined.

5. A method according to claim 3, wherein a theoretical nominal brake torque is determined, based on the total nominal brake torque and the maximum available brake torque of the generator (4), for those friction brakes (2), which are not allocated to an axle of the motor vehicle connected to the generator (4), and an allocated minimum brake torque is predetermined in each case as a nominal brake torque to these friction brakes (2) until the theoretical nominal brake torque determined for this axle has dropped to a predetermined limit value.

6. A method according to claim 5, further comprising determining a theoretical nominal brake torque based on the total nominal brake torque and the maximum available brake torque of the generator (4), for those friction brakes (2), which are allocated to an axle of the motor vehicle connected to the generator (4), and an allocated minimum brake torque is predetermined in each case as a nominal brake torque to these friction brakes (2) until the theoretical nominal brake torque determined for this axle has dropped to a predetermined limit value.

7. A method according to claim 2, wherein a theoretical nominal brake torque is determined for each friction brake (2) by way of the total nominal brake torque and the maximum available brake torque and the maximum available brake torque of the generator (4), and the difference between the theoretical nominal brake torque that is actually output to the respective friction brake and the theoretical nominal brake torque being determined for it, which difference occurs on those friction brakes (2) being allocated to an axle of the motor vehicle connected to the generator (4), is output in a predetermined share as an additional nominal brake torque to those friction brakes (2), which are not allocated to the axle of the motor vehicle connected to the generator (4).

8. A method according to claim 7, wherein the output in a predetermined share is approximately 25%.

9. A brake system (1) of a motor vehicle which includes an electric generator (4) and a number of hydraulic, electronically controllable friction brakes (2) being allocated to axles of the motor vehicle, with the brake system (1) controllable by of a control unit (12), wherein the brake system (1) is controlled using a method comprising: initially, activating only the generator (4) according to specification of a situation responsively determined total nominal brake torque;
   connecting the friction brakes (2) in a delayed manner only when the total nominal brake torque exceeds a maximum available brake torque of the generator (4) by a predetermined first maximum brake torque difference; and
   maintaining the friction brakes at a constant brake torque before a minimum brake torque difference is attained between the total nominal brake torque and the maximum available brake torque of the generator.

10. A brake system according to claim 9, wherein only friction brakes (2), of the brake system (1) are initially connected, that are not allocated to an axle of the motor vehicle that is connected to the generator (4).

* * * * *